United States Patent [19]

Erlach

[11] Patent Number: 4,950,130
[45] Date of Patent: Aug. 21, 1990

[54] PELTON TURBINE

[75] Inventor: Josef Erlach, Ravensburg-Oberzell, Fed. Rep. of Germany

[73] Assignee: Sulzer Brothers Limited, Winterthur, Switzerland

[21] Appl. No.: 405,736

[22] Filed: Sep. 11, 1989

[30] Foreign Application Priority Data

Oct. 6, 1988 [CH] Switzerland ............... 3714/88

[51] Int. Cl.$^5$ ............................................. F03B 7/00
[52] U.S. Cl. ............................ 415/202; 416/197 B
[58] Field of Search ................ 415/202, 201, 203, 88, 415/92, 91; 416/197 B, 197 R

[56] References Cited

U.S. PATENT DOCUMENTS

| | | | |
|---|---|---|---|
| 584,579 | 6/1897 | Davidson | 416/197 R |
| 906,049 | 12/1908 | Memmel | 415/202 |
| 927,657 | 7/1909 | Kemble | 415/202 |
| 1,448,893 | 3/1923 | Wiki | 415/202 |
| 4,345,160 | 8/1982 | Smith | 416/197 B |

FOREIGN PATENT DOCUMENTS 0012314 1/1881 Fed. Rep. of Germany .
0319779 3/1921 Fed. Rep. of Germany .
0615445 7/1935 Fed. Rep. of Germany .

Primary Examiner—Robert E. Garrett
Assistant Examiner—Hoang Nguyen
Attorney, Agent, or Firm—Kenyon & Kenyon

[57] ABSTRACT

The Pelton turbine includes a wheel disc with buckets mounted within a casing on a rotatable drive shaft. At least one nozzle is provided for expelling a fluid jet tangentially of the disc onto the buckets. A partition divides the interior of the housing into a spray fluid and outlet region and an upper ventilation region. The driving fluid falls from the buckets into a sump in the outlet region while residual fluid is wiped off the turbine wheel by the partition. The ventilation region allows ventilation of the casing and also produces a flow of gas for increasing the pressure in the sump to improve the outflow of fluid.

20 Claims, 2 Drawing Sheets

PELTON TURBINE

This invention relates to a Pelton turbine.

As is known, Pelton turbines are used for driving electricity generators or as a direct drive for working machines. Generally, such Pelton turbines include a casing in which a turbine wheel with a wheel disc and buckets is mounted along with a drive shaft which passes through the casing. In addition, at least one jet is provided for expelling fluid from a high pressure nozzle tangentially of the wheel disc onto the buckets so as to cause rotation of the disc and drive shaft. The casing has also been provided with a fluid outlet for removal of the spent fluid. Turbines of this type are described in German Pat. Nos. 12,314; 319,779 and 615,445.

Because of the reversal of momentum of the jet of drive fluid on the buckets, mechanical power is delivered to the turbine wheel. In the case of an electricity generator, the power is delivered at a constant speed. In addition, the driving fluid which is diverted in the buckets falls into a sump below the wheel disc and, in the process, some of the fluid sprays onto the casing walls. As is known, the efficiency of a Pelton turbine is closely dependent on the success of keeping vagrant spray water away from the turbine wheel and the buckets. In some cases, the drive shaft has been disposed on a horizontal axis while the lower region of the turbine wheel is acted upon by the fluid jets. In these cases, the upper region of the casing has been provided with vertical metal sheets parallel to the plane of the turbine wheel while horizontal sheets are disposed opposite the high pressure nozzle in order to prevent spray water from reaching the upper region of the casing.

In Pelton turbines used at variable speed for driving working machines, these conventional baffles do not give satisfactory results. On the one hand, the outlet conditions from the buckets vary as a result of the large but necessary fluctuations in speed and load. This, in turn, results in considerable differences in spray fluid conditions. On the other hand, there are great variations in the amounts of fluids and these have to be taken into account in the construction by providing high overflow levels so that large quantities of fluid can be discharged without the turbine wheel becoming immersed in the sump. Favorable conditions, favorable efficiency, can be obtained only within narrow limits and when conditions are approximately constant.

Accordingly, it is an object of the invention to improve the efficiency of a Pelton turbine.

It is another object of the invention to reduce the amount of spray water on a rotating wheel disc of a Pelton turbine.

It is another objects of the invention to be able to use a Pelton turbine at variable speeds and outputs.

It is another object of the invention to obtain low dissipation losses and high efficiency in the operation of a Pelton turbine.

Briefly, the invention provides a Pelton turbine which is comprised of a casing having a fluid outlet, a drive shaft extending through the casing, a wheel disc mounted on the shaft within the casing with a plurality of buckets peripherally mounted thereon and at least one nozzle for expelling a fluid jet tangentially of a lower portion of the disc onto the buckets for rotating the disc and shaft. In accordance with the invention, a partition is disposed in the casing to separate an upper ventilation region from a lower spray fluid and outlet region thereof. This partition has an opening for passage of the disc into the separated regions.

By means of the partition, which closely abuts the turbine wheel, the spray fluid is efficiently separated from the wheel disc and buckets without rebounding and is returned to a fluid sump in the lower end of the casing even if there are variations in speed and load.

The partition is located so that more than half the turbine wheel rotates in the relatively dry ventilation region. The overall result is low dissipation losses and high efficiency. In this respect, the efficiency characteristics depending on speed and load are high and flatter than in previously known constructions.

The casing is also provided with a ventilation outlet which communicates with the ventilation region.

In addition, the partition is provided with a large opening at one end for passage of the buckets therethrough from the ventilation region into the spray fluid and outlet region. Thus, the quantities of gas (e.g. air) rotating with the turbine wheel are used to build up a pressure cushion above the liquid sump thus efficiently assisting the outflow of fluid particularly at high speeds. This advantage can be taken into account in the dimensional construction of the fluid outlet, that is, by reducing the required overflow level and, thus, reducing the overall height.

The effect of ventilating the turbine wheel is so great that liquid can be discharged over obstacles which are higher than the liquid level in the turbine sump. This effect is further intensified if a double guide duct is provided in the ventilation region of the casing and, over a limited length around the periphery of the wheel disc, to return the radially outgoing gas to the bases of the buckets for further acceleration. The resulting kinetic energy can be converted to pressure.

These and other objects and advantages of the invention will become more apparent from the following detailed description taken in conjunction with the accompanying drawings wherein.

Figure 1:
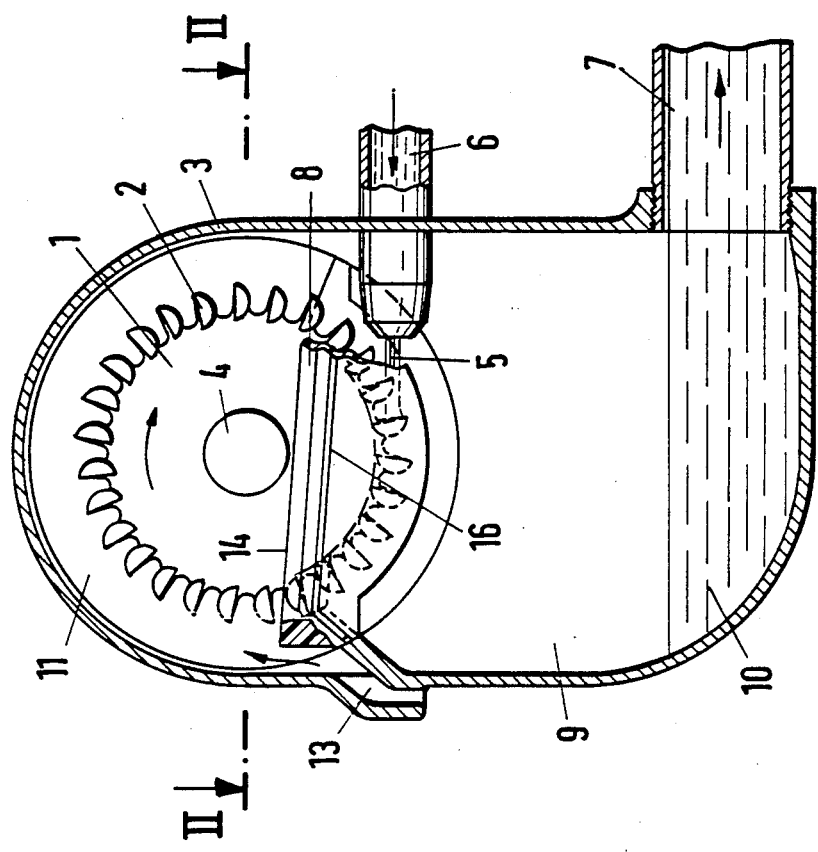
FIG. 1 illustrates a cross sectional view of a Pelton turbine constructed in accordance with the invention.

Referring to FIG. 1, the Pelton turbine comprises a turbine wheel having a wheel disc 1 and a plurality of buckets 2 peripherally mounted on the wheel disc 1. In addition, the turbine has a casing 3 for housing the disc 1 and buckets while a rotatable drive shaft 4 passes through the casing 3 and receives the wheel disc 1 in mounted relation.

As indicated, the Pelton turbine has a high-pressure nozzle 6 passing through the casing 3 for expelling a fluid jet 5 tangentially of the disc 1 and sequentially onto the buckets 2 for rotating the disc 1 and the shaft 4 in known fashion. The casing 3 also has a fluid outlet 7 at a lower end which communicates with a sump 10 for receiving spent fluid which has been ejected onto the buckets 2.

The direction of the fluid jet 5 and the direction of rotation of the disc 1 are indicated by arrows.

Figure 2:
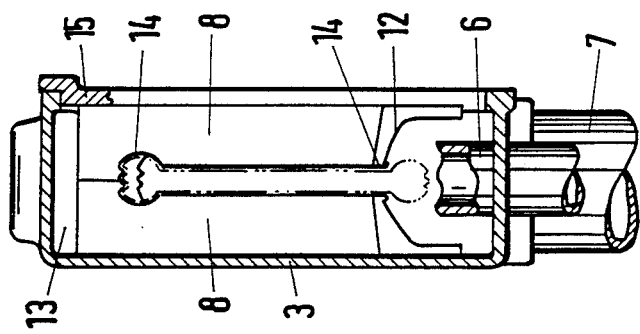
FIG. 2 illustrates a view taken on line II—II of FIG. 1.

Referring to FIGS. 1 and 2, the transversely disposed partition 8 is disposed in the casing 3 to separate a lower spray and outlet region 9 from an upper ventilation region 11. This partition 8 is contoured so as to sealingly engage with the casing 3 while being in sealing relation with the wheel 1. In addition, as indicated in FIG. 2, the partition 8 has suitable openings for passage of the buckets 2. As shown in FIG. 1, the partition 8 is disposed above the nozzle 6 so as to maintain the fluid and, particularly, sprays of fluid, below the partition 8 within the spray fluid and outlet region 9. In this way, all of the fluid can be dumped into the sump 10 for removal through the outlet 7. In addition, the sealing relation between the partition 8 and the disc 1 permits fluid which has been sprayed onto the disc 1 to be wiped off the disc 1 and buckets into the sump 10. In this way, the wheel disc 1 may rotate in air within the ventilation region 11.

The casing 3 is also provided with a ventilation opening 13 which communicates with the ventilation region 11. As indicated, the ventilation opening 13 is connected to atmosphere and opens into the ventilation region 11 precisely at a place where the buckets 2 leave the spray fluid and outlet region 9. As indicated in FIG. 2, the partition 8 has a relatively large opening at the opposite end for passage of the buckets 2 from the ventilation region 11 into the spray fluid and outlet region 9. This opening is of parabolic shape and has an apex on the wheel disc 1. As also indicated, the remaining contour of the partition 8 is spaced from the disc 1 with a clearance 14 of the order of 5% of the width of a respective bucket. In this respect, a contactless sealing means faces the disc in order to seal the ventilation region 11 from the spray fluid and outlet region 9.

Apart from the aperture 12 and the recess for the turbine wheel, the partition 8 is connected in seal-tight manner to the casing 3 via a soft seal 16 (see FIG. 1). As also illustrated, the partition 8 has a curved part extending radially outwardly of the buckets 2 which is directed into the spray fluid and outlet region 9 for discharging spray fluid. The partition 8 also has a sloped upper part which extends downwardly toward one end, that is, toward the opening 12. This permits quantities of gas which rotate with the wheel disc 1 to be used to build up a pressure cushion within the region 9 above the sump 10. This serves to assist the outflow of fluid through the outlet 7, particularly at high speeds.

The partition 8 may be made of any suitable material such as plastic. Also, the partition 8 may be made as an integral part of the casing 3. As indicated in FIG. 2, a removable side wall 15 is located on the side of the casing 3 in order to provide for access into the interior of the casing 3.

The partition 8 has a thickness at the end where the buckets 2 move from the spray fluid and outward region 9 into the ventilation region 11 which is equal to the distance of at least one bucket 2 to the following one. Thus, at any particular time, one bucket enters the contour region of the partition 8 before the bucket in front leaves the contour of the partition 8.

Figure 3:
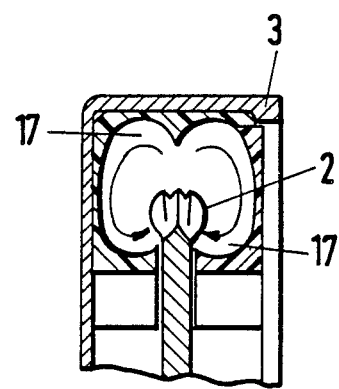
FIG. 3 illustrates a diagrammatic radial section through a casing and turbine wheel employing a guide duct for increasing ventilation in accordance with the invention.

Referring to FIG. 3, in order to increase the ventilation effect, a double guide duct 17 is incorporated into the ventilation region 11 and is peripherally spaced about the disc 1 in order to deflect a radially outwardly flowing gas stream for return towards the bases of the buckets 2 as indicated by the arrows.

The operation of the Pelton turbine may be varied from time-to-time, for example, by varying the speed and/or load moment. This may be accomplished by varying the amount of fluid ejected by the nozzle 6.

The invention thus provides a Pelton turbine of improved construction which is capable of operating in a relatively efficient manner. Further, the invention provides a relatively simple means of keeping vagrant spray water away from the turbine wheel and buckets of a Pelton turbine.

I claim:

1. A Pelton turbine comprising
a casing having a fluid outlet;
a transversely disposed partition in said casing separating a spray fluid and outlet region from a ventilation region therein;
a rotatable drive shaft extending through said casing;
a wheel disc mounted on said shaft within said casing and passing through said partition;
a plurality of peripherally mounted buckets on said disc; and
at least one high-pressure nozzle in said spray fluid and outlet region below said partition for expelling a fluid jet tangentially of said disc sequentially onto said buckets for rotating said disc and said shaft.

2. A Pelton turbine as set forth in claim 1 wherein said partition is disposed across said disc to place about a third of the periphery of said disc in said spray fluid and outlet region.

3. A Pelton turbine as set forth in claim 1 wherein said casing includes a ventilation opening communicating with said ventilation region.

4. A Pelton turbine as set forth in claim 1 wherein said partition has a large opening at one end for passage of said buckets therethrough from said ventilation region into said spray fluid and outlet region, and wherein said partition is spaced from said disc with a clearance of the order of 5% of the width of a respective bucket.

5. A Pelton turbine as set forth in claim 4 wherein said partition has a thickness at a second end for passage of said buckets therethrough from said spray fluid and outlet region into said ventilation equal to the distance of at least one bucket to the following one.

6. A Pelton turbine as set forth in claim 1 wherein said partition has a contactless sealing means facing said disc to seal said regions from each other across said disc.

7. A Pelton turbine as set forth in claim 1 wherein said partition is connected in seal-tight manner to said casing at opposite sides thereof.

8. A Pelton turbine as set forth in claim 1 wherein said partition has a curved part extending radially outwardly of said buckets and directed into said spray fluid and outlet region for discharging spray fluid and a sloped upper part extending downwardly toward one end with a large opining thereat relative to said disc.

9. A Pelton turbine as set forth in claim 1 wherein said partition is made of plastic.

10. A Pelton turbine as set forth in claim 1 wherein said partition is an integral part of said casing.

11. A Pelton turbine as set forth in claim 1 which further comprises a double guide duct in said ventilation region peripherally spaced about said disc to deflect a radially outwardly flowing gas stream for return towards the bases of said buckets.

12. A Pelton turbine as set forth in claim 1 wherein said nozzle is adapted to expel a variable fluid jet to vary the speed of said shaft.

13. A Pelton turbine comprising
a casing having a fluid outlet;
a drive shaft extending through said casing;
a wheel disc mounted on said shaft within said casing;
a plurality of buckets peripherally mounted on said wheel disc;

at least one nozzle for expelling a fluid jet tangentially of a lower portion of said disc and onto said buckets for rotating said disc and said shaft; and a partition disposed in said casing to separate an upper ventilation region from a lower spray fluid and outlet region thereof, said partition having an opening for passage of said disc therethrough into said regions.

14. A Pelton turbine as set forth in claim 13 wherein said partition is disposed across said disc to place about a third of the periphery of said disc in said spray fluid and outlet region.

15. A Pelton turbine as set forth in claim 13 wherein said partition has a curved part extending radially outwardly of said buckets and directed into said spray fluid and outlet region for discharging spray fluid.

16. A Pelton turbine as set forth in claim 15 wherein said partition has a large opening at one end for passage of said buckets therethrough from said ventilation region into said spray fluid and outlet region.

17. A Pelton turbine as set forth in claim 13 wherein said casing includes a ventilation opening communicating with said ventilation region.

18. A Pelton turbine as set forth in claim 13 wherein said partition has a pair of walls parallel to said disc to define a channel for passage of said brackets therethrough.

19. A Pelton turbine as set forth in claim 18 wherein each said wall has a curved part directed into said spray fluid and outlet region and said nozzle is aligned with said channel.

20. A Pelton turbine as set forth in claim 13 wherein said partition is sealingly connected to said casing.

* * * * *